United States Patent [19]
Hoeg et al.

[11] 3,710,007
[45] Jan. 9, 1973

[54] ELECTRICAL CABLE

[75] Inventors: Donald F. Hoeg, Mount Prospect, Ill.; Leo V. Legg, Tulsa, Okla.; Donatas Tijunelis, Buffalo Grove, Ill.

[73] Assignee: Borg-Warner Corporation, Chicago, Ill.

[22] Filed: Dec. 16, 1971

[21] Appl. No.: 208,624

[52] U.S. Cl. ...174/120 AR, 174/110 AR, 174/113 R, 174/116, 174/120 SR
[51] Int. Cl. ............................................. H01b 7/02
[58] Field of Search..........174/100 R, 113 R, 110 AR, 116, 174/120 R, 120 SR, 120 AR

[56] References Cited

UNITED STATES PATENTS 3,299,202 1/1967 Brown .......................... 174/110 R
3,614,300 10/1971 Wilson .......................... 174/110 R Primary Examiner—E. A. Goldberg
Attorney—William S. McCurry et al.

[57] ABSTRACT

An electrical conducting cable for submersible motors adapted for use in high temperature, high pressure oil wells. The cable includes separately insulated conductors disposed within an epichlorohydrin rubber jacket. The conductors are insulated with a layer of high temperature, high molecular weight, heat stabilized polypropylene as the primary insulation. The jacketed cable unit is protected by an outer armor formed of a high temperature, high molecular weight, heat stabilized, polypropylene. The cable thus formed is flexible, abrasion resistant, solvent resistant, liquid impervious, heat in sensitive and unaffected by well environment.

4 Claims, 2 Drawing Figures

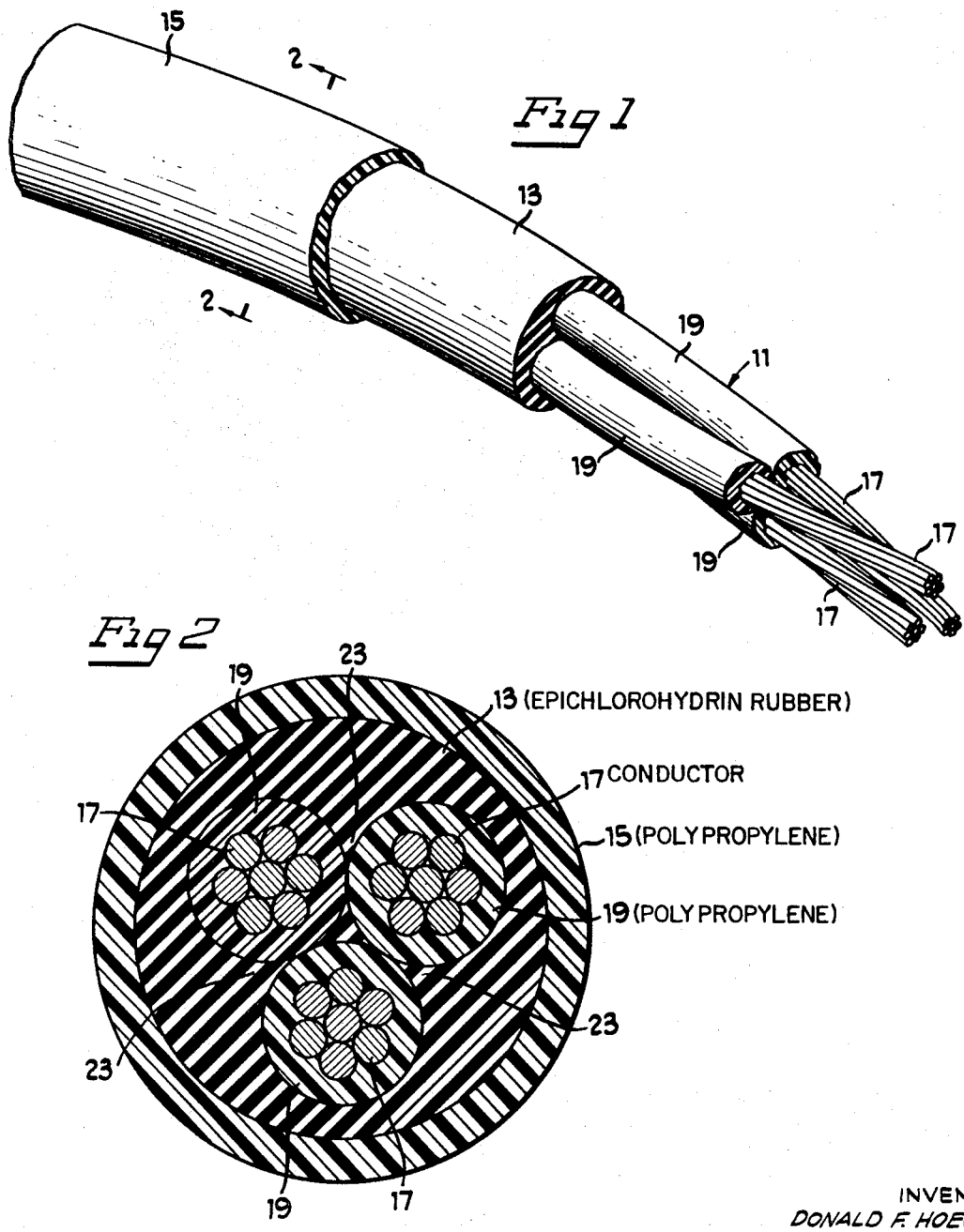

ELECTRICAL CABLE

BACKGROUND OF THE INVENTION

This invention relates to electrical cable. More particularly, it relates to electrical cable utilized to deliver electrical energy to submersible motors adapted for use in high temperature, high pressure oil wells.

Submersible pumps used in oil, mineral and water wells normally include a prime mover in the form of an electric motor directly coupled to the pump and disposed deep within the well. It is, therefore, necessary to provide an electrical connection between the motor and a source of electrical energy at the surface. This is normally accomplished by the use of an electrical conducting cable which extends between the source of electrical energy and the motor.

In many instances, the motors operate at relatively high power levels, in some cases exceeding 200 horsepower. Normally, the motors used are of the three-phase type and the associated cable includes three separate electrical conductors.

The electrical cable must have adequate current carrying capability and must be of sufficient dielectric strength to prevent electrical losses even under the adverse environmental conditions usually found within the well. The environmental conditions of the well vary generally depending upon geographical location. In some cases the well fluid is highly corrosive and in many instances well temperatures exceed 250°F. Most oil wells contain dissolved $H_2S$ gas, carbonates, salts and large volumes of oil. Additionally, the wells are quite deep, averaging 8,000 to 10,000 feet. The electrical cable must possess enough physical strength to allow insertion of the motor and cable to these depths and the outer surface of the cable must resist the abrasion associated with insertion. Since the cable is normally wound upon storage or transportation reels, it must possess the additional property of flexibility so that it will resist physical damage caused by reeling.

Typical cable construction presently being utilized includes three conductors of stranded copper separately insulated and helically wound to form a single unit. The stranded conductors are insulated with a material of high dielectric strength such as polyethylene or polypropylene. The helically wound and insulated conductors are sheathed in an extruded jacket of nitrile rubber surrounding the insulated conductors.

One common form of jacketed cable is covered with an outer armor in the form of a continuous wrapped band of metallic material. This band is lapped as it is wound. The armor provides abrasion resistance. Usually, the armor is formed of steel or bronze; however, in many special applications, such as wells which are excessively corrosive, stainless steel or exotic metals such as monel metal must be used.

The equipment required to wind the metallic band to form the armor is expensive, complex and slow. Further, splicing of the armor cable in the field is complicated because of the presence of the metallic outer layer.

Polyethylene has also been employed to a limited extent as the outer armor, but it has been found that the same does not stand up under severely high temperatures.

Proper material selection for the cable armor has always presented difficulties. Many different armor materials must be utilized depending upon the well conditions and no single cable construction has been found suitable for universal application. This is especially true for the deep, high pressure and high temperature wells.

Electrical power cables constructed as previously described which have been used in high temperature, high pressure oil wells, fail because of temperature distortion of the thermoplastic cable components, corrosion of the armor, or chemical and solvent attack of the elastomer jacket. Since most oil wells contain dissolved $H_2S$ gas, carbonates, water, salts and large volumes of oil, no single material has the resistance to solvents, heat and pressure to operate for prolonged periods in such an environment.

An additional problem encountered by cables in such an environment is deformation under load. The cables are subject to both compressive and tensile forces and, under high temperatures, there is a marked tendency for the jacketing to deform resulting in dislocation of the conductors and phase to phase or phase to ground short circuitry.

Rupture of the armor due to swell of the jacket is another example of deformation which occurs in such an environment. Rupture of the total construction also occurs during retraction of the cable from the well as a result of the depressurization of fluids which have permeated the cable.

These and other associated difficulties have clearly dictated the need for an improved impermeable, environment insensitive cable construction.

Accordingly, it is the principal object of the present invention to provide an improved multicomponent cable construction for a submersible motor.

More particularly, it is an object of the present invention to provide a cable for a submersible motor designed for service under high temperature and high pressure oil well conditions.

SUMMARY OF THE INVENTION

The present invention relates to an improved multicomponent electrical cable for submersible motors adapted for use in high temperature, high pressure oil wells. More particularly, it relates to a cable construction which includes an outer armor of high temperature, high molecular weight, heat stabilized polypropylene, an inner jacket of epichlorohydrin rubber and a high temperature, synthetic, organic insulator surrounding the electrical conductors.

The polypropylene used for the outer armor is of a type not normally used for wire insulation because of its processing difficulties but possesses a maximum of heat resistance especially with respect to high temperature creep characteristics. An example of a suitable armor material is a high molecular weight polypropylene homopolymer of high isotactic level.

The epichlorohydrin rubber used for the jacket is compounded for the minimum of oil and water permeability and swell.

The type of insulator disclosed for use in high temperature, high pressure oil wells is a high temperature, high molecular weight, heat stabilized, polypropylene which is an excellent electrical insulator at elevated temperatures when unaffected by oil. A polypropylene homopolymer of predominantly isotactic structure has been found to be a good choice.

The outer armor of polypropylene is water insensitive and water impermeable so that it protects the epichlorohydrin rubber jacket. The epichlorohydrin rubber jacket is insensitive to any oil which may have permeated the polypropylene armor and in addition is highly oil impermeable providing a barrier which protects the polypropylene insulation. The result is a minimum of water or oil permeation, or any effect therefrom.

These and other objects and advantages of the present invention will become apparent with reference to the following description and accompanying drawings.

DESCRIPTION OF DRAWINGS

FIG. 1 is a fragmentary perspective view of a section of electrical conducting cable for submersible motors illustrating various features of the invention.

FIG. 2 is a cross-sectional view of the cable of FIG. 1 taken generally along the lines 2—2 of FIG. 1.

DESCRIPTION OF ILLUSTRATED EMBODIMENTS

Referring now to the drawing, there is shown a multicomponent electrical conducting cable for a submersible motor designed for use in high temperature, high pressure oil wells which is illustrative of the principles of the present invention.

FIG. 1 shows a cable section which includes conductors 11, a resilient jacket 13 and an outer armor 15.

Each conductor 11 is formed of stranded wire 17 helically wound to prevent separation of strands. These separate strands may be tinned to minimize chemical interaction between the conductor and the insulating material.

In the illustrated embodiment each conductor includes seven strands. The number of conductors, the diameter of the conductor and number of wires is, of course, dependent upon the load carrying capabilities required for a particular cable application. It should additionally be noted that any suitable conducting material may be used, such as for example, copper, aluminum, etc.

Each wound set of wire strands forms a single conductor and is separately insulated by an insulation layer 19. The conductor insulation 19 is formed of a high temperature, organic, synthetic material of high dielectric strength. One example found to be satisfactory for this purpose is a high temperature, high molecular weight, heat stabilized polypropylene.

If the conducting material is copper the polypropylene conductor will have to be copper stabilized in addition to being heat stabilized. Copper stabilization of olefin rubbers and polymers is well-known in the art and can be accomplished in a manner such as disclosed in U. S. Pat. Nos. 3,535,257 or 3,549,572 or any other acceptable method of copper stabilization. If the conducting material is other than copper other stabilization may be required. An extruded covering of such an insulator may be used to form the conductor insulation.

A preferred embodiment of a high temperature, high molecular weight, heat stabilized polypropylene homopolymer insulating material is commercially available under the trade name Avisun 1046 from Amoco Corporation. This material has been found to possess the following physical properties:

Molecular Weight — High as evidenced by reduced viscosity of $\eta_{SPIe} = 3.5$ dl/g tested in Decalin at 135°C.

Specific gravity — 0.90 – 0.91 at 23°C (ASTM-D-792-64T)

Flow Rate — at 230°C, 2,160 gram load, 5.0 grams per 10 minutes (ASTM-D-1238-65T)

Deflection temperature — 230°F at 66PSI (ASTM-D-648-61)

Deformation under load — 3.5% at 2000 PSI (24 hrs. at 50°C) (ASTM-D-621-64)

Water Absorption — 0.01% (ASTM-D-570-63)

Flexural Modulus — 180,000 PSI (0.05 in/min CHS) (ASTM-D-790-66)

As previously mentioned this polypropylene may have to be modified for copper or other metal stabilization depending upon the conductive material which may somewhat alter its physical properties.

The wound conductor unit is disposed within the jacket 13 which is comprised of a high molecular weight epichlorohydrin rubber compounded for the minimum of oil and water permeability and swell. This jacket may be extruded about the wound conductors and preferably is formed to fill interstices 23 between adjacent conductors.

One preferred embodiment is a formulation of epichlorohydrin compounded of the materials and in approximately the ratios as follows:

| Trade Name | Material | Parts/100 parts of rubber | Available from |
|---|---|---|---|
| Herclor H | High Molecular Weight epichlorohydrin rubber | 100.0 | Hercules, Inc. |
| Span 60 | Surface active agent comprised of partial esters of hexitol anhydrides | 1.5 | Atlas Chemical Industries |
| Dyphos XL | Di-Basic Lead Phosphite (heat stabilizer) | 10.0 | National Lead Company |
| N B C | Nickel dibutyl dithio-carbamate (anti-oxidant) | 1.0 | Du Pont |
| Cumate | Copper, dimethyl dithio-carbamate (accelerator) | 0.125 | R.T. Vanderbilt Company |
| Phenothiazine | Phenothiazine | 1.0 | Fisher Scientific Company |
| Vulcan | Carbon Black (filler) | 30.0 | Cabot Corporation |
| Hi Sil 233 | Silica (filler) | 10.0 | P.P.G. Industries |
| TE-70 | Plasticizers | 0.5 | Technical Processing, Inc. |
| TP-95 | Plasticizers | 1.0 | Thiokol Chemical Corp. |
| Azelaic Acid | Dispersant | 4.0 | Eastman Organic Chemicals |
| NA-22 | 2 mercaptothiazoline (accelerator) | 1.0 | Du Pont |

The extruded epichlorohydrin jacket completely fills the voids formed about the separately insulated conductors. This precludes exposure of the insulation to well fluid and further prevents flow of well fluid along the cable length in the event that a rupture occurs at some point along the outer armor 15 and the outer periphery of jacket 13.

The jacket 13 of the cable is surrounded by the extruded outer armor 15 formed of a high temperature, high molecular weight, heat stabilized polypropylene.

The polypropylene previously described for the insulating material is a preferred embodiment for the outer armor and has exhibited excellent heat resistance especially with respect to high temperature creep characteristics. When used for the outer armor it would not be necessary to modify this polypropylene for copper or other metal stabilization.

The polypropylene used for the outer armor must have a very low water sensitivity to protect the epichlorohydrin jacket from any swelling which, in turn, would keep any traces of oil from attacking the polypropylene primary insulation. This is necessary because when unaffected by oil this particular polypropylene is an excellent electrical insulator at the elevated temperatures at which it must operate in a high temperature, high pressure oil well.

The outer armor is preferably formed by extruding. The extruded armor is formed in surrounding relation to the jacketed cable unit as the cable unit progresses through an appropriate extrusion die. Thus, a completely sealed, fluid impervious armor is efficiently formed about the jacket 13 which separates the jacket and the well fluid and protects the internal components of the cable from physical and chemical damage.

The particular polypropylene described has a dielectric strength of about 650 to 750 volts per mil. It has excellent abrasion resistance and forms a smooth outer cable surface. It is resistant to the attack of chemical agents such as $H_2S$ gas, carbonates, salts and oil found within the well and provides a barrier against moisture, oils and greases. It has a water absorption of about 0.03 percent. Additionally, this polypropylene retains its abrasion resistance at both high and low temperatures and it has little, if any, environmental stress cracking. The polypropylene described is sufficiently resilient to allow reeling and unreeling of the motor cable without cracking the protective armor.

While polypropylene generally is somewhat sensitive to light and, under certain conditions, suffers loss of dielectric strength, it has been found that the addition of darkening pigments as well as ultra-violet light stabilizers to the polypropylene armor adequately protects the armor from deterioration caused by exposure to light.

Use of a multicomponent cable such as that described provides a cable construction which is abrasion resistant, impervious to well fluids, flexible and unaffected by corrosive well environments and high temperatures. Further, construction of the cable is simplified by extruding the armor onto the jacketed cable unit.

An example of a well cable illustrating features of the present invention has been constructed. It includes three seven-wire stranded copper conductors, each of which is surrounded by a high temperature, high molecular weight, heat and copper stabilized polypropylene insulation having an average thickness of 0.072 inch. The separate conductors are helically wound to form a single unit. The conductors are jacketed with an epichlorohydrin rubber. The jacket thickness is 0.040 inch minimum average. The jacket is provided with a surrounding high temperature, high molecular weight, heat stabilized polypropylene armor having an average thickness of 0.085 inch.

As can be appreciated, the cable construction of the present invention provides an efficient and durable conducting unit for use in the adverse environment associated with high temperature, high pressure oil wells. The outer armor is easily formed and possesses the desirable physical properties making it suitable for application as a cable for submersible well motors.

While the epichlorohydrin rubber utilized for the jacket 13 was Herclor H (Hercules, Inc.), an epichlorohydrin homopolymer (poly (alpha - chloropropylene oxide)), other homopolymers of epichlorohydrin such as Hydrin 100 (B.F. Goodrich) are suitable for this application. Also epichlorohydrin rubbers prepared from epichlorohydrin and ethylene oxide are suitable for the jacket 13. These copolymers are sold under the trade name Herclor C (Hercules, Inc.) and Hydrin 200 (B.F. Goodrich).

Various features of the invention have been particularly shown and described in connection with the illustrated embodiments of the invention. However, it must be understood that these particular arrangements are for illustrative purposes and that the invention is to be given its fullest interpretation within the scope of the appended claims.

What is claimed is:

1. A multicomponent electrical cable adapted for use with a submersible motor, comprising at least one electrical conductor; a layer of insulating material surrounding said conductor formed of a high temperature, synthetic, organic insulator; a resilient jacket surrounding said insulation comprising an epichlorohydrin rubber of high molecular weight and an outer armor surrounding said resilient jacket formed of a high temperature, high molecular weight, heat stabilized polypropylene.

2. A multicomponent cable as in claim 1 wherein said high temperature, synthetic, organic insulator is a high temperature, high molecular weight, heat stabilized polypropylene.

3. A multicomponent cable as in claim 2 wherein said high temperature, high molecular weight, heat stabilized polypropylene is also copper stabilized.

4. A multicomponent cable as in claim 1 wherein said conductor is copper and said high temperature, synthetic, organic insulator is copper stabilized.

* * * * *